(12) United States Patent
Yamaoka et al.

(10) Patent No.: US 8,003,562 B2
(45) Date of Patent: Aug. 23, 2011

(54) SILICA BASE COMPOSITE PHOTOCATALYST AND PROCESS FOR PRODUCING THE SAME

(75) Inventors: Hiroyuki Yamaoka, Ube (JP); Yoshikatsu Harada, Ube (JP); Teruaki Fujii, Ube (JP); Shinichirou Otani, Ube (JP); Tadashi Matsunaga, Ube (JP)

(73) Assignee: Ube Industries, Ltd. (JP)

( * ) Notice: Subject to any disclaimer, the term of this patent is extended or adjusted under 35 U.S.C. 154(b) by 190 days.

(21) Appl. No.: 12/442,533

(22) PCT Filed: Sep. 14, 2007

(86) PCT No.: PCT/JP2007/067936
§ 371 (c)(1),
(2), (4) Date: Jun. 15, 2009

(87) PCT Pub. No.: WO2008/038529
PCT Pub. Date: Apr. 3, 2008

(65) Prior Publication Data
US 2010/0087311 A1    Apr. 8, 2010

(30) Foreign Application Priority Data
Sep. 27, 2006   (JP) .................................. 2006-261869

(51) Int. Cl.
*B01J 21/08* (2006.01)
*B01J 21/06* (2006.01)
*B01J 23/02* (2006.01)
*C03C 12/02* (2006.01)
*C04B 35/46* (2006.01)
*C04B 35/465* (2006.01)
*C04B 35/468* (2006.01)
*C04B 35/47* (2006.01)

(52) U.S. Cl. ........ 502/242; 502/158; 502/240; 502/250; 502/350; 502/340; 502/527.14; 502/527.24; 501/35; 501/38; 501/137

(58) Field of Classification Search ................. 502/158, 502/240, 242, 250, 350, 340, 527.14, 527.24; 501/35, 38, 137
See application file for complete search history.

(56) References Cited

U.S. PATENT DOCUMENTS
6,541,416 B2 * 4/2003 Ishikawa et al. ............. 502/240
6,753,292 B2 * 6/2004 Yamaoka et al. ............. 502/242

FOREIGN PATENT DOCUMENTS
| JP | 10-305230 | | 11/1998 |
|---|---|---|---|
| JP | 2000-079388 | | 3/2000 |
| JP | 2002-371436 | | 12/2002 |
| JP | 3444012 B | * | 9/2003 |
| JP | 2003-285069 | | 10/2003 |
| JP | 2004-107841 | | 4/2004 |
| JP | 2004-181409 | | 7/2004 |
| WO | 2005/040058 A1 | | 5/2005 |

* cited by examiner

*Primary Examiner* — Stanley Silverman
*Assistant Examiner* — Diana J Liao
(74) *Attorney, Agent, or Firm* — Clark Hill PLC

(57) ABSTRACT

A silica base composite photocatalyst that has appropriate water purification capability, inhibiting precipitation of metal oxides; and a process for producing the same. The silica base composite photocatalyst is one composed mainly of a composite oxide phase consisting of an oxide phase (first phase) composed mainly of silica component and a titania phase (second phase) wherein the ratio of presence of the second phase increases as lope toward the surface layer, characterized in that at least one metal oxide selected from among strontium titanate and barium titanate is contained in the second phase.

6 Claims, 1 Drawing Sheet

SILICA BASE COMPOSITE PHOTOCATALYST AND PROCESS FOR PRODUCING THE SAME

TECHNICAL FIELD

The present invention relates to a high-strength silica-based composite photocatalyst having an excellent photocatalytic function, an electric function and/or a thermal catalytic function, and a process for producing the same. In more detail, it relates to a high-strength inorganic fiber having a core (silica phase) bearing the dynamical property and a photocatalytic function excellent as an environment purification material having various functions usable in water quality purification and so forth, and a process for producing the same.

BACKGROUND ART

In recent years, purification of water using a photocatalyst has been considered. The purification of water with the photocatalyst is a very safe purification method from the viewpoint of nonuse of hazardous substances to human bodies, such as chlorine and ozone. In such the use, a photocatalyst film (comprising a base material coated with a photocatalyst) is considered in general. In this case, various adherents may fix onto the photocatalyst film and cause blockage of light and coating over the surface, which prevent the photocatalytic performance. Many of the adherents are resulted from metal ions present in water, which are adsorbed onto the surface of photocatalyst fibers and oxidized. The use of a fiber-shaped photocatalyst described in Patent Document 1 causes an excellent expectable purification performance but allows adherents to easily fix thereon as a problem because of a larger surface area than the photocatalyst film. Namely, if the fiber-shaped photocatalyst can be prevented from adherent fixation, it is very useful as a photocatalyst for processing water.

For removal of such the metal oxides attached onto the photocatalyst, processes of acid cleaning and cutting off may be applied. These processes are dangerous, though, and may possibly deteriorate the photocatalytic performance, and accordingly different measures are required. For example, there is a process for applying activated oxygen to precipitate metal ions in processed water and filtering the produced solid as described in Patent Document 2. There is another process for using a potential having the same polarity as the polarity of metal ions, which is applied on the photocatalyst surface.

Patent Document 1: JP Patent No. 3465699
Patent Document 2: JP 2004-181409A
Patent Document 3: JP 2003-285069A

DISCLOSURE OF THE INVENTION

Problem to be Solved by the Invention

The process described in Patent Document 2, however, requires a different device in addition to the purification device with the photocatalyst and accordingly the entire device has a larger scale and leaves a problem about higher costs. The process described in Patent Document 3 similarly requires a device for applying electric potential.

The present invention therefore has an object to provide a silica-based composite photocatalyst having an excellent water purification performance and capable of suppressing the precipitation of metal oxides with a simple configuration, and a process for producing the same.

Means to Solve the Problem

The present inventors et al. have intensively studied to solve the above object and consequently found that it is possible to achieve an excellent water purification performance and suppress the precipitation of metal oxides with a simple configuration, that is, a silica-based composite photocatalyst comprising a composite oxide phase, the composite oxide phase principally including an oxide phase (first phase) composed mainly of a silica component, and a titania phase (second phase), the second phase having an existence ratio increasing with a gradient toward the surface layer, in which the second phase contains at least one metal oxide or more of strontium titanate and barium titanate. Namely, the present invention is directed to a silica-based composite photocatalyst comprising a composite oxide phase, the composite oxide phase principally including an oxide phase (first phase) composed mainly of a silica component, and a titania phase (second phase), the second phase having an existence ratio increasing with a gradient toward the surface layer, wherein the second phase contains at least one metal oxide or more of strontium titanate and barium titanate.

The present invention is also directed to a process for producing a silica-based composite photocatalyst, comprising melt spinning, curing and then firing a modified polycarbosilane or a mixture of the modified polycarbosilane, the modified polycarbosilane principally including a polycarbosilane having a backbone represented by the following formula 2, the polycarbosilane having a number average molecular weight of 200-10,000, the modified polycarbosilane having a structure modified with an organo-titanium compound and at least one organometal compound or more of an organo-strontium compound and an organo-barium compound, the mixture of the modified polycarbosilane including the organo-titanium compound and the organometal compound.

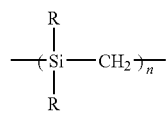

[Formula 2]

(where R indicates a hydrogen atom, a lower alkyl group or a phenyl group).

Effect of the Invention

As described above, in accordance with the present invention, it is possible to provide a silica-based composite photocatalyst having an excellent water purification performance and capable of suppressing the precipitation of metal oxides with a simple configuration, and a process for producing the same.

THE BEST MODE FOR CARRYING OUT THE INVENTION

In the silica-based composite photocatalyst of the present invention, the oxide phase (first phase) composed mainly of a silica component may be amorphous or crystalline and may contain a metal element or a metal oxide capable of forming a solid solution or eutectic compound with silica. A metal element (A) capable of forming a solid solution with silica and a metal element (B) of which oxide is capable of forming a compound in specific composition with silica are not limited in particular. Examples of (A) may include titanium and examples of (B) may include aluminum, zirconium, yttrium, lithium, sodium, barium, calcium, boron, zinc, nickel, manganese, magnesium and iron.

The first phase forms an internal phase of the catalyst produced in the present invention and plays an important role in bearing the dynamic property. Preferably, the existence ratio of the first phase is 98-40 wt % on the basis of the entire silica-based composite photocatalyst. More preferably, the existence ratio of the first phase is controlled within 50-95 wt. % to allow the second phase to sufficiently express the function and also express a higher dynamic property.

Titania contained in the second phase plays an important role in expressing the photocatalytic function intended in the present invention. In addition, at least one metal oxide or more of strontium titanate and barium titanate contained in the second phase plays an important role in preventing attachment of metal oxides. Both strontium titanate and barium titanate may be contained in the second phase. Preferably, the existence ratio of the second phase forming the surface layer of the catalyst is 4-60 wt. % on the basis of the entire silica-based composite photocatalyst. More preferably, it is controlled within 5-50 wt. % to sufficiently express the functions and also express a higher strength at the same time. Preferably, the content of at least one metal oxide or more of strontium titanate and barium titanate contained in the second phase is 2-40 wt. % on the basis of the entire silica-based composite photocatalyst. More preferably, it is controlled within 3-20 wt. % to sufficiently express the function and also express a higher strength at the same time. Preferably, the gradient of the existence ratio of metal elements other than titanium contained in the second phase exists within 5-500 nm in depth from the surface of the catalyst. Preferably, titania contained in the second phase is 15 nm or below in diameter of a crystal grain and has a photocatalytic function.

The silica-based composite photocatalyst according to the present invention contains at least one metal oxide or more of strontium titanate and barium titanate such that the isoelectric point of the photocatalyst is adjusted to 8 or more. Preferably, the silica-based composite photocatalyst according to the present invention is a fiber-shaped silica-based composite photocatalyst fiber though it may be a particle, a film or a thin film.

The silica-based composite photocatalyst according to the present invention can be produced through the above-described method, which is described separately in a first step through a fourth step. The process of production of the silica-based composite photocatalyst according to the present invention is schematically shown in FIG. 1.

The first step is a step of producing a modified polycarbosilane having a number average molecular weight of 1,000-50,000, which is used as a starting material for production of the silica-based composite photocatalyst. A basic method of producing the modified polycarbosilane is extremely analogous to JP 56-74126A though the present invention requires careful control of the bonding state of the functional group described therein. This point is briefly described below.

The starting material or the modified polycarbosilane can be derived from a polycarbosilane having a backbone represented by the following formula 3 and having a number average molecular weight of 200-10,000, and an organometal compound having a basic structure represented by the general formula, M (OR')n or MR"m (where M indicates titanium and a metal element other than titanium; R' an alkyl group or a phenyl group having 1-20 carbon atoms; R" acetylacetonato; and m and n are integers larger than 1). The organometal compound requires the use of an organo-titanium compound and at least one organometal compound or more of an organo-strontium compound and an organo-barium compound and preferably has a smaller molecular weight than the modified polycarbosilane to be formed.

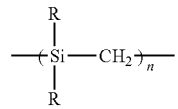

[Formula 3]

(where R indicates a hydrogen atom, a lower alkyl group or a phenyl group).

Examples of the organo-titanium compound for use in formation of titanic may include tetrabutoxy titanium and titanium isopropoxide. Examples of the organo-strontium compound for use in formation of the strontium titanate may include strontium isopropoxide. Examples of the organo-barium compound for use in formation of the barium titanate may include bisacetylacetonato barium.

Production of the catalyst having the graded composition of the present invention requires selection of a slow reaction condition under which only a portion of the organometal compound makes a bond with polycarbosilane. For that purpose, it is required to react at a temperature of 280° C. or below, preferably 250° C. or below, in an inert gas. Under this condition, even if the above organometal compound reacts with polycarbosilane, it bonds as a mono-functional polymer (that is, bonds in a pendant-shape) without causing a large increase in molecular weight. The modified polycarbosilane partly bonded to the organometal compound plays an important role in improving the compatibility between polycarbosilane and the organometal compound.

If bi-functional or much higher multifunctional groups are bonded, a crosslinking structure is formed in polycarbosilane and a remarkable increase in molecular weight is recognized. In this case, a sharp production of heat and a rise in melt viscosity occur during reaction. On the other hand, if only the mono-function reacts and the organometal compound partly resides non-reacted, a drop in melt viscosity is observed conversely.

In the present invention it is desirable to select the condition for leaving the non-reacted organometal compound as intended. In the present invention, a material principally including the modified polycarbosilane and a non-reacted organometal compound or an organometal compound up to dimer-trimer coexisting therewith is used as the starting material. Only the modified polycarbosilane can be used as the starting material of the present invention if it contains a modified polycarbosilane component having an extremely low molecular weight.

In the second step, the modified polycarbosilane or the mixture of the modified polycarbosilane and the organometal compound produced at the first step is melted to create a spinning dope, which may be filtered to remove hazardous substances to spinning, such as microgels and impurities, depending on the case, and spun at a synthetic fiber spinning machine for normal use. The temperature of the spinning dope varies in accordance with the softening temperature of the raw material or the modified polycarbosilane though it falls within 50-200° C. advantageously. The above spinning machine may include a humidifying/heating cylinder on the lower portion of a nozzle, if required. The fiber diameter can be adjusted by changing the amount of discharge from the nozzle and the winding speed at a high-speed winder installed on the lower portion of the spinning machine. A melt blow method or a span bond method may be applied to directly mold the fiber discharged from the nozzle in the shape of felt without winding it.

In the second step, other than the melt spinning, the modified polycarbosilane or the mixture of the modified polycarbosilane and the organometal compound produced at the first step is dissolved in benzene, toluene, xylene, or other solvents capable of melting the modified polycarbosilane and the organometal compound to create a spinning dope, which may be filtered to remove hazardous substances to spinning, such as macrogels and impurities, depending on the case. Thereafter, the spinning dope is spun through a dry spinning method at a synthetic fiber spinning machine for normal use and the winding speed is controlled to produce the target fiber.

In these spinning steps, a spinning cylinder may be attached to the spinning machine, if required, and the atmosphere inside the cylinder is turned into an atmosphere mixed with at least one gas of the above solvents or into an atmosphere of air, an inert gas, hot air, a hot inert gas, steam, an ammonia gas, a hydrocarbon gas or an organosilicon compound gas, thereby controlling solidification of the fiber inside the spinning cylinder.

Next, at the third step, the spun fiber is preheated under the effect of a tensile force or no tensile force in an oxidizing atmosphere to cure the spun fiber. This step is provided for the purpose of preventing the fiber from melting and adhering to adjacent fibers at the time of firing in the post step. The processing temperature and the processing time vary depending on the composition and, not defined in particular, a condition within 50-400° C. for several hours to 30 hours is selected on processing in general. The above oxidizing atmosphere may contain a substance for enhancing the ability to oxidize the spun fiber, such as moisture, nitrogen oxides and ozone, and the partial pressure of oxygen may be changed as intended.

Depending on the proportion of the organometal compound contained in the raw material, the softening temperature of the spun fiber may lower below 50° C. In such the case, a process may be applied previously to facilitate oxidization of the fiber surface at a lower temperature than the above processing temperature. During the third step and the second step, bleeding-out of the low molecular weight compound contained in the raw material onto the fiber surface proceeds to form the groundwork for the target graded composition as considered.

Next, at the fourth step, the cured fiber is fired under a tensile force or no tensile force within a temperature range of 500-1800° C. in an oxidizing atmosphere to produce the target silica-based composite photocatalyst comprising a composite phase, which includes an oxide phase (first phase) composed mainly of a silica component, and a titania phase (second phase), in which the existence ratio of the constituent component in the second phase increases with a gradient toward the surface layer. In this step, organic components contained in the cured fiber are oxidized basically though they may stay as carbon or carbides in the fiber depending on the selected condition. Even in such the case, the fiber can be used in that condition if there is no trouble in achieving the target function but a further oxidization is applied if there is a trouble. At that time, it is required to select a temperature and processing time that cause no problem on the target graded composition and crystal structure.

EXAMPLES

The following description is given to examples of the silica-based composite photocatalyst fiber according to the present invention.

Reference Example 1

A first description is given to a process for producing polycarbosilane, which is used as a raw material of the silica-based composite photocatalyst fiber according to the present invention. First, a 5-liter three-neck flask was prepared to contain 2.5 liters of anhydrous toluene and 400 g of metal sodium therein and heated to the boiling point of toluene under a nitrogen gas current to drop 1 liter of dimethyldichlorosilane over 1 hour. After completion of the drop, it was heated and refluxed for 10 hours to produce a precipitate. The precipitate was filtered and washed with methanol and then washed with water to obtain 420 g of white powdery polydimethylsilane. Then, 250 g of polydimethylsilane were fed into a three-neck flask equipped with a water-cooling reflux device and heated and reacted under a nitrogen current at 420° C. for 30 hours to obtain polycarbosilane having a number average molecular weight of 1200.

Example 1

Applied to 50 g of the polycarbosilane synthesized through the process of the reference example 1 are 100 g of toluene and 50 g of tetrabutoxy titanium, and then 5 g of bisacetylacetonato barium, followed by preheating at 100° C. for 1 hour. Thereafter, the temperature was slowly elevated up to 150° C. to distill off toluene, followed by reaction for 5 hours in that condition, and then the temperature was further elevated up to 250° C., followed by reaction for 5 hours to synthesize a modified polycarbosilane. Added to the modified polycarbosilane for the purpose of achieving coexistence of a low-molecular weight organometal compound as intended are 5 g of tetrabutoxy titanium and 2 g of bisacetylacetonate barium to obtain a mixture of the modified polycarbosilane and the low-molecular weight organometal compound.

The mixture of the modified polycarbosilane and the low-molecular weight organometal compound was dissolved in toluene and then fed into a glass-made spinning machine. The inside was sufficiently replaced by nitrogen and the temperature was then elevated to distill off toluene, followed by melt spinning at 180° C. Subsequently, the spun fiber was heated up to 150° C. in stages and cured in air, followed by firing in air at 1200° C. for 1 hour to obtain a silica-based composite photocatalyst fiber according to the example 1.

The resultant silica-based composite photocatalyst fiber according to the example 1 (an average diameter: 8 μm) was found to comprise amorphous silica and anatase titania and barium titanate as a result of an X-ray analysis and to include 80 wt. % of silica, 17 wt. % of titania and 3 wt. % of barium titanate as a result of a fluorescent X-ray analysis. The distributed condition of the constituent atoms was examined by EPMA and the graded composition was confirmed to include titanium that increases toward the surface as in Ti/Si (molar ratio)=0.88 within an area of 1 μm of the outermost circumference, Ti/Si (molar ratio)=0.17 within an area of 2-3 μm of the outermost circumference, and Ti/Si (molar ratio)=0.02 at the central portion. Similarly, the graded composition was confirmed to include barium that increases toward the surface as in Ba/Si (molar ratio)=0.05 within an area of 1 µm of the outermost circumference, Ba/Si (molar ratio) 0.02 within an area of 2-3 µm of the outermost circumference, and Ba/Si (molar ratio) 0.01 at the central portion. The fiber was found to have a tensile strength of 1.8 GPa. In addition, the zeta potential on the silica-based composite photocatalyst fiber according to the example 1 was measured to find the isoelectric point, which was pH=8.5-9.0.

For the purpose of examining the resultant silica-based composite photocatalyst fiber according to the example 1 for the effect on anti-attachment of metal oxides, 0.2 g of the fiber was fed into a 60 mm diameter Petri dish, into which a solution of ferric chloride and manganese chloride dissolved in water was supplied (at respective concentrations of 10 mg/L, 60 mg/L, pH=7.8). To the Petri dish, 254 nm wavelength ultraviolet rays were applied from above for 24 hours. After the application, the fiber was removed out of the Petri dish and dried, followed by observing the fiber surface with an electron microscope. As a result, confirmed was no attachment of metal oxides on the fiber surface, which indicates an excellent anti-attachment effect.

Next, for the purpose of examining the diameter of a crystal grain of titania in the resultant silica-based composite photocatalyst fiber according to the example 1, TEM (Transmission Electron Microscope) observation was performed. As a reference, in the example 1, the spun fiber was cured and then fired at 1225° C. and 1250° C., instead of firing at 1200° C., to obtain silica-based composite photocatalyst fibers, which were similarly observed. As a result, crystal grains of titania in the silica-based composite photocatalyst fibers fired at 1200° C., 1225° C. and 1250° C. were found to have diameters of 8 nm, 12 nm and 20 nm, respectively.

Further, for the purpose of examining the photocatalytic performance of the silica-based composite photocatalyst fibers fired at 1200° C., 1225° C. and 1250° C., 0.2 g of each of these fibers was fed into a 60 mm diameter Petri dish, into which 20 milliliters of water containing a million pieces of $E. coli$ per milliliter were supplied. To the Petri dish, black light having a wavelength of 351 nm was applied from above at intensity of 1 mW/cm$^2$ for 3 hours. After the application, the fungus liquid was collected from the Petri dish and cultured in an agar culture medium. Then, the residual coliform counting was examined. As a result, the residual coliform counting indicated 0 piece in the silica-based composite photocatalyst fiber fired at 1200° C., 5 pieces in the silica-based composite photocatalyst fiber fired at 1225° C., and 20 pieces in the silica-based composite photocatalyst fiber fired at 1250° C. This indicates that the lower the firing temperature and the smaller the crystal grain diameter of titania, the more the photocatalytic activity becomes excellent.

Example 2

Applied to 50 g of the polycarbosilane synthesized through the process of the reference example 1 are 100 g of toluene and 50 g of tetrabutoxy titanium, and then 8 g of strontium isopropoxide, followed by preheating at 100° C. for 1 hour. Thereafter, the temperature was slowly elevated up to 150° C. to distill off toluene, followed by reaction for 5 hours in that condition, and then the temperature was further elevated up to 250° C., followed by reaction for 5 hours to synthesize a modified polycarbosilane. Added to the modified polycarbosilane for the purpose of achieving coexistence of a low-molecular weight organometal compound as intended are 5 g of tetrabutoxy titanium and 4 g of strontium isopropoxide to obtain a mixture of the modified polycarbosilane and the low-molecular weight organometal compound.

The mixture of the modified polycarbosilane and the low-molecular weight organometal compound was dissolved in toluene and then fed into a glass-made spinning machine. The inside was sufficiently replaced by nitrogen and the temperature was then elevated to distill off toluene, followed by melt spinning at 180° C. Subsequently, the spun fiber was heated up to 150° C. in stages and cured in air, followed by firing in air at 1200° C. for 1 hour to obtain a silica-based composite photocatalyst fiber according to the example 2.

The resultant silica-based composite photocatalyst fiber according to the example 2 (an average diameter: 8 µm) was found to comprise amorphous silica and anatase titania and strontium titanate as a result of an X-ray analysis and to include 80 wt % of silica, 16 wt. % of titania and 4 wt. % of strontium titanate as a result of a fluorescent X-ray analysis. The distributed condition of the constituent atoms was examined by EPMA and the graded composition was confirmed to include titanium that increases toward the surface as in Ti/Si (molar ratio)=0.85 within an area of 1 µm of the outermost circumference, Ti/Si (molar ratio)=0.15 within an area of 2-3 µm of the outermost circumference, and Ti/Si (molar ratio)= 0.02 at the central portion. Similarly, the graded composition was confirmed to include strontium that increases toward the surface as in Sr/Si (molar ratio)=0.06 within an area of 1 µm of the outermost circumference, Sr/Si (molar ratio)=0.02 within an area of 2-3 µm of the outermost circumference, and Sr/Si (molar ratio)=0.01 at the central portion. The fiber was found to have a tensile strength of 1.8 GPa. In addition, the zeta potential on the silica-based composite photocatalyst fiber according to the example 2 was measured to find the isoelectric point, which was pH=8.0-8.5.

For the purpose of examining the resultant silica-based composite photocatalyst fiber according to the example 2 for the effect on anti-attachment of metal oxides, 0.2 g of the fiber was fed into a 60 mm diameter Petri dish, into which a solution of ferric chloride and manganese chloride dissolved in water was supplied (at respective concentrations of 10 mg/L, 60 mg/L, pH=7.8). To the Petri dish, 254 nm wavelength ultraviolet rays were applied from above for 24 hours. After the application, the fiber was removed out of the Petri dish and dried, followed by observing the fiber surface with an electron microscope. As a result, confirmed was no attachment of metal oxides on the fiber surface, which indicates an excellent anti-attachment effect.

Comparison Example 1

Applied to 50 g of the polycarbosilane synthesized through the process of the reference example 1 are 100 g of toluene and 50 g of tetrabutoxy titanium, followed by preheating at 100° C. for 1 hour. Thereafter, the temperature was slowly elevated up to 150° C. to distill off toluene, followed by reaction for 5 hours in that condition, and then the temperature was further elevated up to 250° C., followed by reaction for 5 hours to synthesize a modified polycarbosilane. Added to the modified polycarbosilane for the purpose of achieving coexistence of a low-molecular weight organometal compound as intended is 5 g of tetrabutoxy titanium to obtain a mixture of the modified polycarbosilane and the low-molecular weight organometal compound.

The mixture of the modified polycarbosilane and the low-molecular weight organometal compound was dissolved in toluene and then fed into a glass-made spinning machine. The inside was sufficiently replaced by nitrogen and the temperature was elevated to distill off toluene, followed by melt spinning at 180° C. The spun fiber was heated up to 150° C. in stages and cured in air, followed by firing in air at 1200° C. for 1 hour to obtain a silica-based composite photocatalyst fiber according to the comparison example 1.

The resultant silica-based composite photocatalyst fiber according to the comparison example 1 (an average diameter: 8 μm) was found to comprise amorphous silica and anatase titania as a result of an X-ray analysis and to include 83 wt. % of silica and 17 wt. % of titania as a result of a fluorescent X-ray analysis. The distributed condition of the constituent atoms was examined by EPMA and the graded composition was confirmed to include titanium that increases toward the surface as in Ti/Si (molar ratio)=0.85 within an area of 1 μm of the outermost circumference, Ti/Si (molar ratio)=0.13 within an area of 2-3 μm of the outermost circumference, and Ti/Si (molar ratio)=0.04 at the central portion. The fiber was found to have a tensile strength of 1.8 GPa. In addition, the zeta potential on the silica-based composite photocatalyst fiber according to the comparison example 1 was measured to find the isoelectric point, which was pH=5.0-6.0.

For the purpose of examining the resultant silica-based composite photocatalyst fiber according to the comparison example 1 for the effect on anti-attachment of metal oxides, 0.2 g of the fiber was fed into a 60 mm diameter Petri dish, into which a solution of ferric chloride and manganese chloride dissolved in water was supplied (at respective concentrations of 10 mg/L, 60 mg/L, pH=7.8). To the Petri dish, 254 nm wavelength ultraviolet rays were applied from above for 24 hours. After the application, the fiber was removed out of the Petri dish and dried, followed by observing the fiber surface with an electron microscope. As a result, confirmed was attachment of many metal oxides on the fiber surface. The metal attachments were examined through an X-ray analysis and confirmed as iron oxides and manganese oxides.

Comparison Example 2

Applied to 50 g of the polycarbosilane synthesized through the process of the reference example 1 are 100 g of toluene and 50 g of tetrabutoxy titanium, and then 5 g of iron (III) acetylacetonato, followed by preheating at 100° C. for 1 hour. Thereafter, the temperature was slowly elevated up to 150° C. to distill off toluene, followed by reaction for 5 hours in that condition, and then the temperature was further elevated up to 250° C., followed by reaction for 5 hours to synthesize a modified polycarbosilane. Added to the modified polycarbosilane for the purpose of achieving coexistence of a low-molecular weight organometal compound as intended are 5 g of tetrabutoxy titanium and 2 g of iron (III) acetylacetonate to obtain a mixture of the modified polycarbosilane and the low-molecular weight organometal compound.

The mixture of the modified polycarbosilane and the low-molecular weight organometal compound was dissolved in toluene and then fed into a glass-made spinning machine. The inside was sufficiently replaced by nitrogen and the temperature was elevated to distill off toluene, followed by melt spinning at 180° C. Subsequently, the spun fiber was heated up to 150° C. in stages and cured in air, followed by firing in air at 1200° C. for 1 hour to obtain a silica-based composite photocatalyst fiber according to the comparison example 2.

The resultant silica-based composite photocatalyst fiber according to the comparison example 2 (an average diameter: 8 μm) was found to comprise amorphous silica and anatase titania and iron oxide as a result of an X-ray analysis and to include 80 wt. % of silica, 16 wt. % of titania and 4 wt. % of iron oxide as a result of a fluorescent X-ray analysis. The distributed condition of the constituent atoms was examined by EPMA and the graded composition was confirmed to include titanium that increases toward the surface as in Ti/Si (molar ratio)=0.87 within an area of 1 μm of the outermost circumference, Ti/Si (molar ratio)=0.15 within an area of 2-3 μm of the outermost circumference, and Ti/Si (molar ratio)= 0.03 at the central portion. Similarly, the graded composition was confirmed to include iron that increases toward the surface as in Fe/Si (molar ratio)=0.08 within an area of 1 μm of the outermost circumference, Fe/Si (molar ratio)=0.02 within an area of 2-3 μm of the outermost circumference, and Fe/Si (molar ratio)=0.01 at the central portion. The fiber was found to have a tensile strength of 1.7 GPa. In addition, the zeta potential on the silica-based composite photocatalyst fiber according to the comparison example 2 was measured to find the isoelectric point, which was pH=6.5-7.5.

For the purpose of examining the resultant silica-based composite photocatalyst fiber according to the comparison example 2 for the effect on anti-attachment of metal oxides, 0.2 g of the fiber was fed into a 60 mm diameter Petri dish, into which a solution of ferric chloride and manganese chloride dissolved in water was supplied (at respective concentrations of 10 mg/L, 60 mg/L, pH=7.8). To the Petri dish, 254 nm wavelength ultraviolet rays were applied from above for 24 hours. After the application, the fiber was removed out of the Petri dish and dried, followed by observing the fiber surface with an electron microscope. As a result, confirmed was attachment of many metal oxides on the fiber surface. The metal attachments were examined through an X-ray analysis and confirmed as iron oxides and manganese oxides.

Comparison Example 3

Applied to 50 g of the polycarbosilane synthesized through the process of the reference example 1 are 100 g of toluene and 50 g of tetrabutoxy titanium, and then 3 g of tungsten ethoxide, followed by preheating at 100° C. for 1 hour. Thereafter, the temperature was slowly elevated up to 150° C. to distill off toluene, followed by reaction for 5 hours in that condition, and then the temperature was further elevated up to 250° C., followed by reaction for 5 hours to synthesize a modified polycarbosilane. Added to the modified polycarbosilane for the purpose of achieving coexistence of a low-molecular weight organometal compound as intended are 5 g of tetrabutoxy titanium and 2 g of tungsten ethoxide to obtain a mixture of the modified polycarbosilane and the low-molecular weight organometal compound.

The mixture of the modified polycarbosilane and the low-molecular weight organometal compound was dissolved in toluene and then fed into a glass-made spinning machine. The inside was sufficiently replaced by nitrogen and the temperature was elevated to distill off toluene, followed by melt spinning at 180° C. Subsequently, the spun fiber was heated up to 150° C. in stages and cured in air, followed by firing in air at 1200° C. for 1 hour to obtain a silica-based composite photocatalyst fiber according to the comparison example 3.

The resultant silica-based composite photocatalyst fiber according to the comparison example 3 (an average diameter: 8 μm) was found to comprise amorphous silica and anatase titanic and tungsten oxide as a result of an X-ray analysis and to include 80 wt. % of silica, 15 wt. % of titanic and 5 wt. % of tungsten oxide as a result of a fluorescent X-ray analysis. The distributed condition of the constituent atoms was examined by EPMA and the graded composition was confirmed to include titanium that increases toward the surface as in Ti/Si (molar ratio)=0.85 within an area of 1 μm of the outermost circumference, Ti/Si (molar ratio)=0.13 within an area of 2-3 μm of the outermost circumference, and Ti/Si (molar ratio) =0.04 at the central portion. Similarly, the graded composition was confirmed to include tungsten that increases toward the surface as in W/Si (molar ratio)=0.07 within an area of 1 μm of the outermost circumference, W/Si (molar ratio)=0.02 within an area of 2-3 μm of the outermost circumference, and W/Si (molar ratio)=0.01 at the central portion. The fiber was found to have a tensile strength of 1.6 GPa. In addition, the zeta potential on the silica-based composite photocatalyst fiber according to the comparison example 3 was measured to find the isoelectric point, which was pH=4.0-5.0.

For the purpose of examining the resultant silica-based composite photocatalyst fiber according to the comparison example 3 for the effect on anti-attachment of metal oxides, 0.2 g of the fiber was fed into a 60 mm diameter Petri dish, into which a solution of ferric chloride and manganese chloride dissolved in water was supplied (at respective concentrations of 10 mg/L, 60 mg/L, pH=7.8). To the Petri dish, 254 nm wavelength ultraviolet rays were applied from above for 24 hours. After the application, the fiber was removed out of the Petri dish and dried, followed by observing the fiber surface with an electron microscope. As a result, confirmed was attachment of many metal oxides on the fiber surface. The metal attachments were examined through an X-ray analysis and confirmed as iron oxides and manganese oxides.

Figure 1:
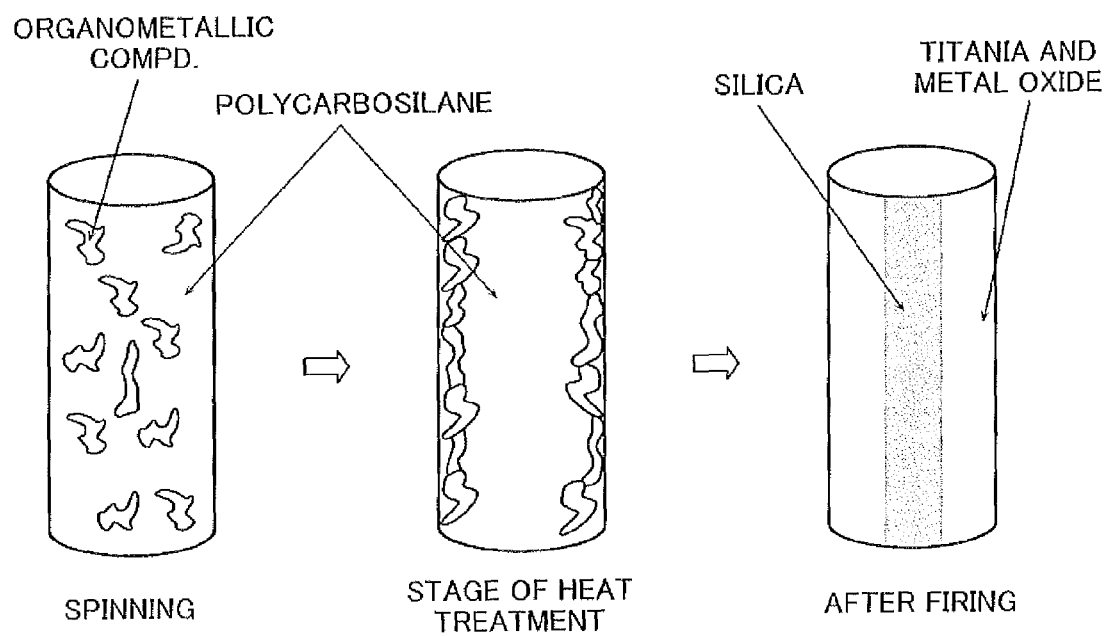
FIG. 1 A diagram schematically showing the stage of production of a silica-based composite oxide according to the present invention.

The invention claimed is:

1. A silica-based composite photocatalyst comprising a composite oxide phase, the composite oxide phase principally including an oxide phase (first phase) composed mainly of a silica component, and a titania phase (second phase) containing titania, the second phase having an existence ratio increasing with a gradient toward a surface of the photocatalyst,
the second phase containing at least one metal oxide of strontium titanate and barium titanate.

2. The silica-based composite photocatalyst according to claim 1, wherein the existence ratio of the first phase is 96-40 wt. % on the basis of the entire silica-based composite photocatalyst and the existence ratio of the second phase is 4-60 wt. % on the basis of the entire silica-based composite photocatalyst.

3. The silica-based composite photocatalyst according to claim 1, wherein the content of the metal oxide is 2-40 wt. % on the basis of the entire silica-based composite photocatalyst.

4. The silica-based composite photocatalyst according to claim 1, wherein the gradient of the existence ratio of metal elements other than titanium contained in the second phase exists within 5-500 nm in depth from the surface of the catalyst.

5. The silica-based composite photocatalyst according to claim 1, wherein titania contained in the second phase is 15 nm or below in diameter of a crystal grain and has a photocatalytic function.

6. A process for producing a silica-based composite photocatalyst according to claim 1, comprising melt spinning, curing and then firing in air or oxygen a modified polycarbosilane or a mixture of the modified polycarbosilane, the modified polycarbosilane principally including a polycarbosilane having a backbone represented by the following general formula,

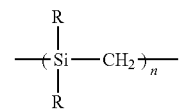

(where R indicates a hydrogen atom, a lower alkyl group or a phenyl group) the polycarbosilane having a number average molecular weight of 200-10,000, the modified polycarbosilane having a structure modified the polycarbosilane with an organo-titanium compound and at least one organometal compound or more of an organo-strontium compound and an organo-barium compound, the mixture of the modified polycarbosilane including the organo-titanium compound and the organometal compound.

* * * * *

UNITED STATES PATENT AND TRADEMARK OFFICE
CERTIFICATE OF CORRECTION

PATENT NO. : 8,003,562 B2 Page 1 of 1
APPLICATION NO. : 12/442533
DATED : August 23, 2011
INVENTOR(S) : Hiroyuki Yamaoka et al.

It is certified that error appears in the above-identified patent and that said Letters Patent is hereby corrected as shown below:

Column 10, Line 58 "15 wt. % of titanic" should be -- 15 wt. % of titania --

Signed and Sealed this
Twenty-eighth Day of August, 2012

David J. Kappos
*Director of the United States Patent and Trademark Office*